US 8,428,424 B2

(12) United States Patent
Hsu

(10) Patent No.: US 8,428,424 B2
(45) Date of Patent: Apr. 23, 2013

(54) APPARATUS AND METHOD FOR TESTING SIGNAL CHANNELS OF DIGITAL VIDEO RECORDER

(75) Inventor: Ming-Yuan Hsu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 317 days.

(21) Appl. No.: 12/954,692

(22) Filed: Nov. 26, 2010

(65) Prior Publication Data

US 2012/0106928 A1    May 3, 2012

(30) Foreign Application Priority Data

Nov. 1, 2010  (TW) ................. 99137389 A

(51) Int. Cl.
*H04N 5/765* (2006.01)

(52) U.S. Cl.
USPC ........... 386/231; 725/115; 725/74; 725/81; 725/80; 386/230; 386/239; 386/326; 386/337

(58) Field of Classification Search .......... 386/231, 386/230, 239, 326; 725/80, 81, 115, 74
See application file for complete search history.

(56) References Cited

U.S. PATENT DOCUMENTS

| 6,601,127 | B1 * | 7/2003 | Nomura et al. ............. 710/306 |
| 6,834,374 | B1 * | 12/2004 | Sameshima ................. 715/736 |
| 7,999,580 | B2 * | 8/2011 | Tashiro ...................... 327/113 |
| 8,214,863 | B2 * | 7/2012 | Kim et al. ................... 725/74 |
| 2005/0034160 | A1 * | 2/2005 | Kim et al. ................. 725/80 |
| 2005/0166241 | A1 * | 7/2005 | Kim et al. ................. 725/81 |
| 2006/0233228 | A1 * | 10/2006 | Liang ........................ 375/222 |
| 2011/0016503 | A1 * | 1/2011 | Schaefer et al. ........... 725/115 |
| 2012/0106928 | A1 * | 5/2012 | Hsu ............................ 386/248 |
| 2012/0134534 | A1 * | 5/2012 | Lee et al. .................... 382/103 |
| 2012/0227072 | A1 * | 9/2012 | Russ et al. ................. 725/53 |

* cited by examiner

*Primary Examiner* — Helen Shibru
(74) *Attorney, Agent, or Firm* — Altis Law Group, Inc.

(57) ABSTRACT

A channel test unit of a digital video recorder (DVR) includes a command generation module generating a selection signal to a controller. The controller outputs control signals to a multiplexer to select an output terminal of the multiplexer to switch to a signal channel. A signal generation module obtains a format voice data and converts to an analog voice signal and sends to the multiplexer. The multiplexer sends the analog voice signal to the selected signal channel after the signal channel is selected. A voice detection module defines an identification (ID) number for each of the signal channels in sequence and detects whether the DVR receives an analog voice signal, and determines whether all of the signal channels have been tested. A display module displays an ID number of the selected signal channel on a display device when the DVR does not receive the analog voice signal.

8 Claims, 3 Drawing Sheets

APPARATUS AND METHOD FOR TESTING SIGNAL CHANNELS OF DIGITAL VIDEO RECORDER

CROSS-REFERENCE OF RELATED APPLICATION

Relevant subject matter is disclosed in a co-pending U.S. patent application with Ser. No. 12/879,016, filed on Sep. 10, 2010, and entitled "APPARATUS AND METHOD FOR TESTING SIGNAL CHANNELS OF DVR", which are assigned to the same assignee as this patent application.

BACKGROUND

1. Technical Field

The present disclosure relates to signal channel test apparatuses and methods, and particularly to an apparatus and a method for testing multiple signal channels of a digital video recorder (DVR).

2. Description of Related Art

A DVR allows a user to record video programs to a recordable medium, and to playback the recorded programs on different multimedia devices, such as televisions or digital video disk (DVD) players. Usually, the DVR may have one or more signal channels for transmitting the programs between the DVR and the multimedia devices. To ensure the transmission functions properly, the performance of the signal channels needs to be tested.

Performance testing of the signal channels of the DVR can be performed at the factory before the DVR is deployed. Typically, the performance test is performed manually. However, such manual performance tests may be complicated and inefficient. Thus, a need arises to address the above-mentioned problems.

BRIEF DESCRIPTION OF THE DRAWINGS

Many aspects of the embodiments can be better understood with reference to the following drawing. The components in the drawing are not necessarily drawn to scale, the emphasis instead being placed upon clearly illustrating the principles of the present embodiments. Moreover, in the drawing, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
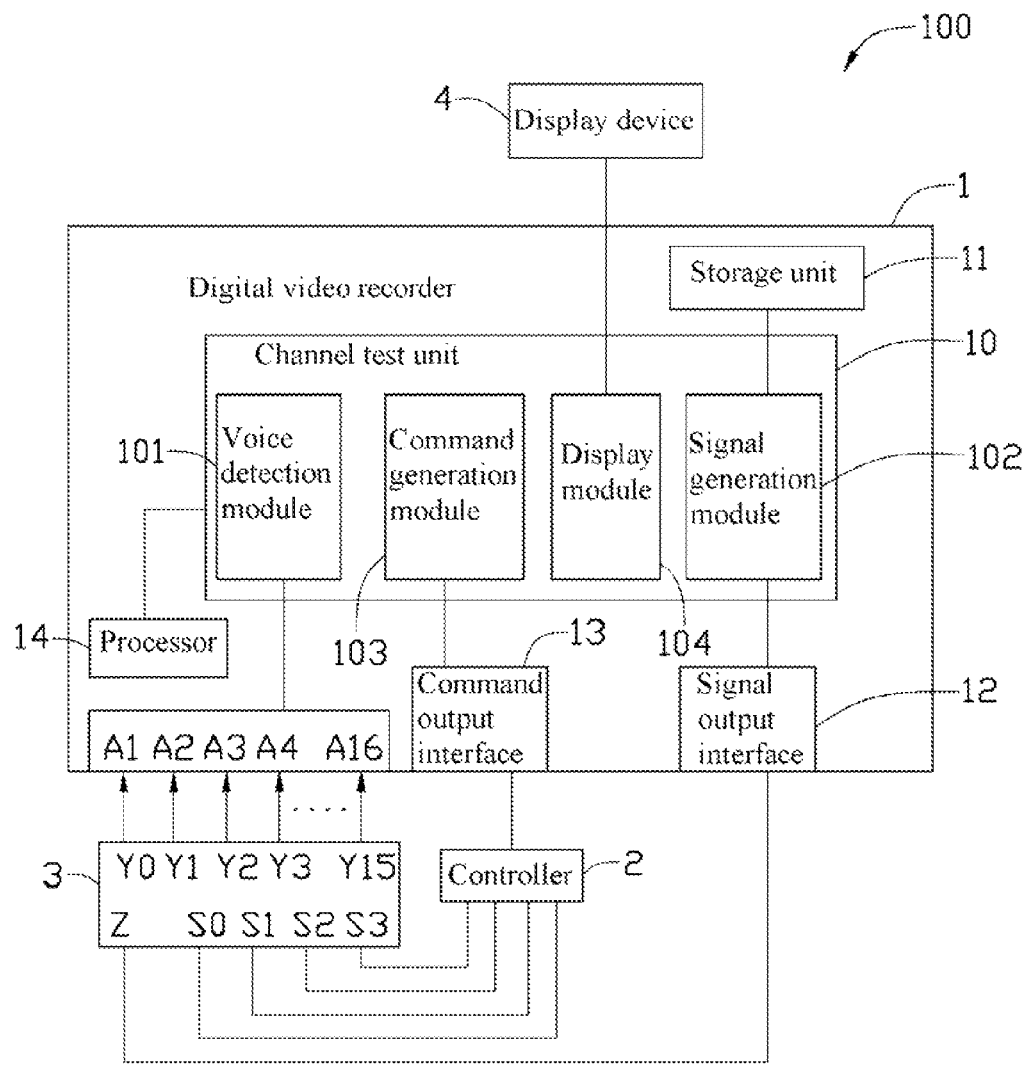
FIG. 1 is a schematic diagram of one embodiment of an apparatus for testing multiple signal channels of a digital video recorder.

FIG. 1 is a schematic diagram of one embodiment of an apparatus 100 for testing signal channels of a digital video recorder (DVR) 1. In the embodiment, the apparatus 100 can test the performance of the signal channels of the DVR 1 using a controller 2 and a multiplexer 3, and display an identification (ID) number of a signal channel on a display device 4 when the signal channel cannot perform the voice transmission function properly. In one embodiment, a type of the multiplexer 3 is 74HC4067. The DVR 1 includes a channel test unit 10, a storage unit 11, a signal output interface 12, a command output interface 13, and a processor 14. The DVR 1 is connected to the controller 2 through the command output interface 13, and connected to the multiplexer 3 through the signal output interface 12. The multiplexer 3 is connected to the controller 2, and connected to the DVR 1 through a number of signal channels. In the embodiment, the signal channels are denoted as A1, A2, A3, A4, . . . , and A16 respectively, and are used to transfer voice signals from the multiplexer 3 to the DVR 1.

The storage unit 11 stores voice data having different voice formats, such as a wave audio files (WAV) format, and a windows media audio (WMA) format. The signal output interface 12 is connected to an input terminal Z of the multiplexer 3, to output analog voice signals to multiplexer 3. The command output interface 13 is connected to the controller 2, to output a selection signal to the controller 2. The controller 2 is connected to address input terminals S0-S3 of the multiplexer 3, to output control signals to the multiplexer 3 according to the selection signal. The signal channels A1, A2, A3, A4, . . . , and A16 of the DVR 1 are respectively connected to output terminals Y0-Y15 of the multiplexer 3, to receive the analog voice signals through the multiplexer 3. In one embodiment, the storage unit 11 may be an internal storage unit in the DVR 1, such as a random access memory (RAM) for temporary storage of information, and/or a read only memory (ROM) for permanent storage of information. In some embodiments, the storage unit 11 may also be an external storage unit, such as an external hard disk, a storage card, or a data storage medium. In one embodiment, the signal output interface 12 may be an Electronic Industry Association recommended standard-232 (EIA-RS-232) interface, and the command output interface 13 may be a universal serial bus (USB) interface.

The channel test unit 10 includes a voice detection module 101, a signal generation module 102, a command generation module 103, and a display module 104. One or more computerized instructions for the function modules 101-104 may be stored in the storage unit 11 and executed by the processor 14. In general, the word "module," as used herein, refers to logic embodied in hardware or firmware, or to a collection of software instructions, written in a programming language. The software instructions in the modules may be embedded in firmware, such as an erasable programmable read only memory (EPROM). The modules described herein may be implemented as either software and/or hardware modules and may be stored in any type of computer-readable medium or other storage units.

The voice detection module 101 is configured to define an ID number for each of the signal channels A1, A2, A3, A4, . . . , and A16 of the DVR 1 in sequence. The voice detection module 101 is further configured to detect whether the DVR 1 receives an analog voice signal from each of the signal channels A1-A16, and determine whether all of the signal channels A1-A16 have been tested according to the ID numbers. In one embodiment, the voice detection module 101 detects the ID number of the signal channel to determine whether the signal channel has been tested.

The signal generation module 102 is configured to obtain voice data from the storage unit 11, and convert the voice data to an analog voice signal, and outputs the analog voice signal to the input terminal Z of the multiplexer 3 through the signal output interface 12.

The command generation module 103 is configured to generate a selection signal for selecting a signal channel to be tested, and send the selection signal to the controller 2 through the command output interface 13. The controller 2 outputs control signals to the address input terminals S0-S3 of the multiplexer 3 according to the selection signal. An output terminal of the multiplexer 3 is switched to a signal channel to be tested when the multiplexer 3 receives the control signal. At the same time, the multiplexer 3 sends the received analog voice signal to the signal channel to be tested. For example, if the first signal channel A1 needs to be tested, the generating module 103 generates a first selection signal for selecting the first signal channel A1 and outputs the selection signal to the controller 2. The controller 2 outputs control signals, such as "0000" to the address input terminal S0-S3 of the multiplexer 3 according to the selection signal. Wherein, "0" represents a low level signal, and "1" represents a high level signal. The multiplexer 3 receives the control signals and selects an output terminal, such as Y0, to switch to a signal channel, such as the signal channel A1 to be tested from the signal channels according to the selection signal. After the signal channel is selected, the multiplexer 3 sends the received analog voice signal to the selected signal channel A1. If the second signal channel A2 needs to be tested, the generating module 103 generates a second selection signal for selecting the second signal channel A2 and outputs the second selection signal to the controller 2. The controller 2 outputs control signals, such as "0100" to the address input terminal S0-S3 of the multiplexer 3 according to the selection signal. The multiplexer 3 receives the control signals and selects an output terminal, such as Y1, to switch to the signal channel to be tested, such as the signal channel A2 from the signal channels to be tested according to the selection signal. After the signal channel is selected, the multiplexer 3 sends the received analog voice signal to the selected signal channel A2.

The display module 104 is configured to display the ID number of the selected signal channel on a display device 4 if the DVR 1 does not receive the analog voice signal from the selected signal channel, to indicate that the signal channel cannot perform the voice transmission function properly.

Figure 2A:
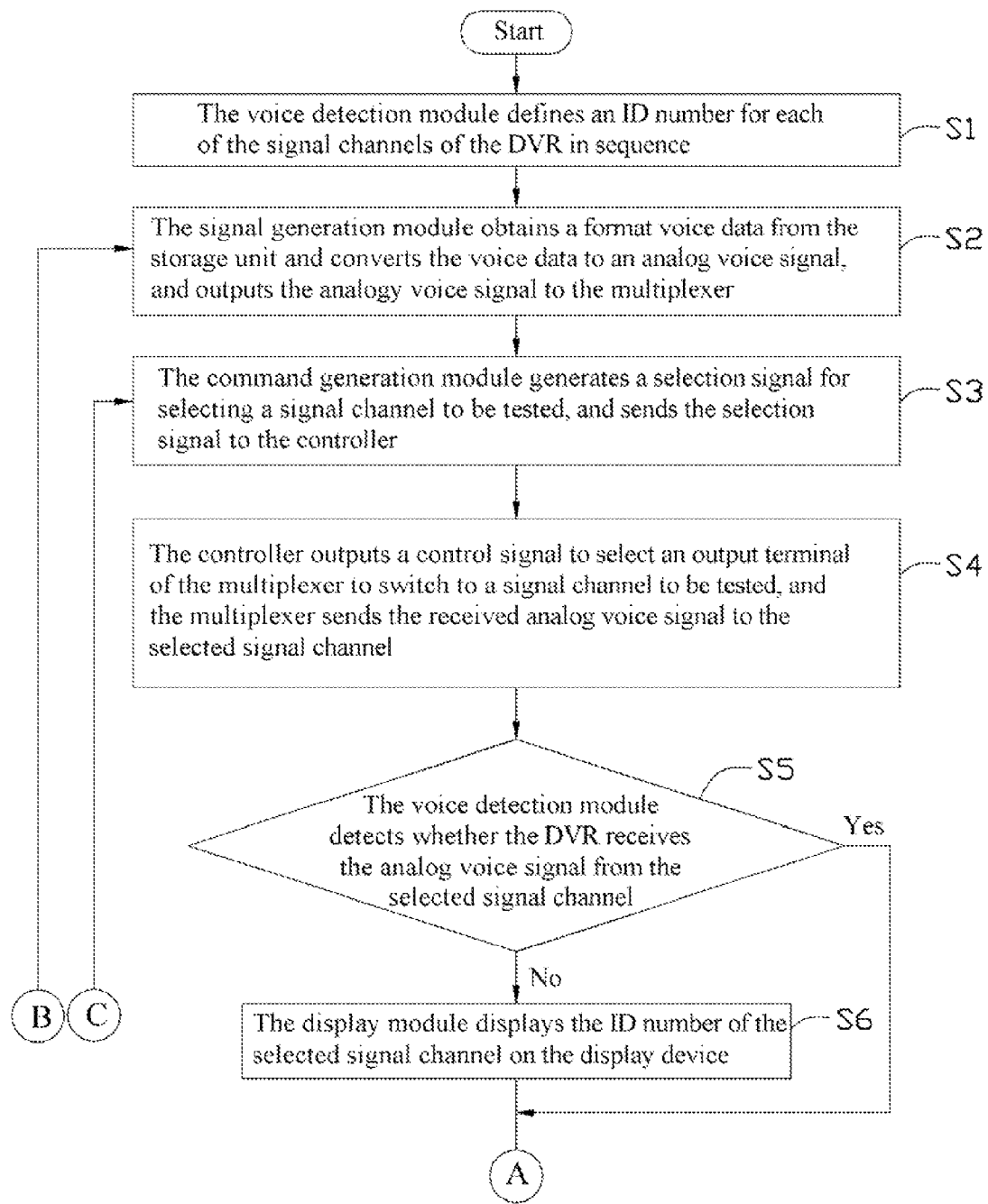
FIGS. 2A and 2B are a flowchart of one embodiment of a method for testing multiple signal channels of a digital video recorder using the apparatus of FIG. 1.
Figure 2B:
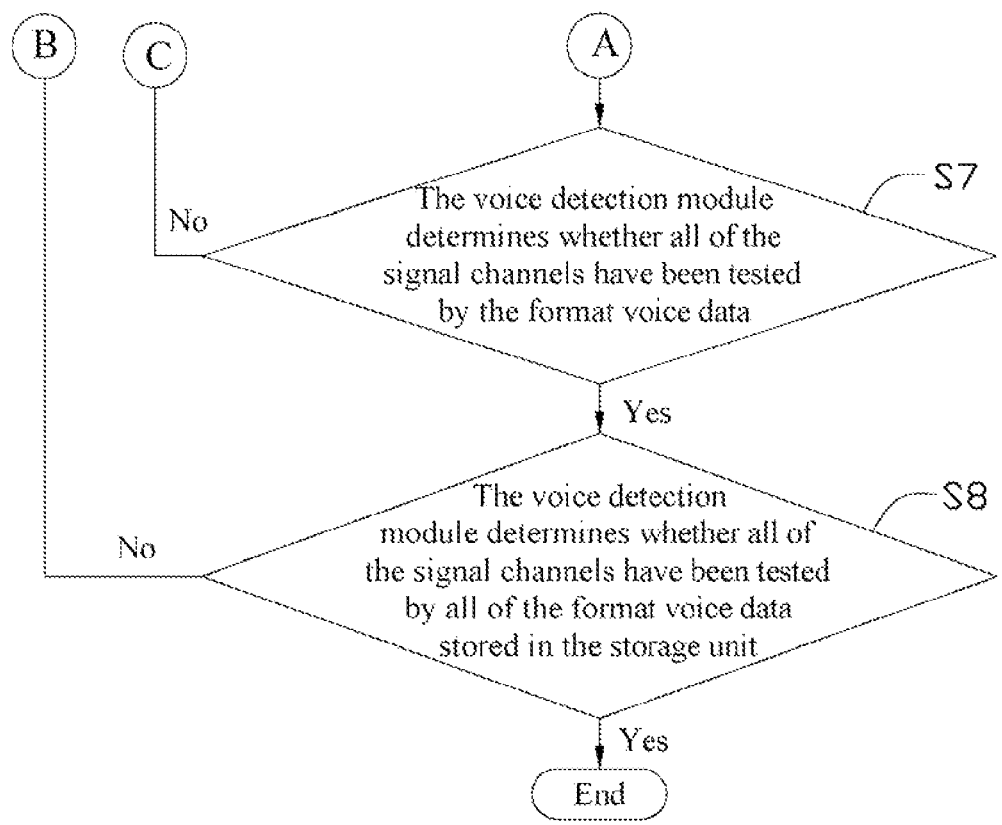

Referring to FIGS. 2A and 2B, one embodiment of a method for testing multiple signal channels of the DVR 1 uses the apparatus 100 of FIG. 1. In the embodiment, the method can test performance of the signal channels of the DVR 1, and displays an ID number of a signal channel on the display device 4 when the signal channel cannot perform the voice transmission function properly.

In block S1, the voice detection module 101 defines an ID number for each of the signal channels of the DVR 1 in sequence, for example, the signal channels are respectively denoted by A1, A2, A3, A4, ..., and A16.

In block S2, the signal generation module 102 obtains a format voice data from the storage unit 11, and converts the voice data to an analog voice signal, and outputs the analog voice signal to the input terminal Z of the multiplexer 3 through the signal output interface 12.

In block S3, the command generation module 103 generates a selection signal for selecting a signal channel to be tested, and sends the selection signal to the controller 2 through the command output interface 13.

In block S4, the controller 2 outputs control signals to the address input terminals S0-S3 of the multiplexer 3 according to the received selection signal, to select an output terminal of the multiplexer 3 to switch to a signal channel to be tested from the signal channels according to the selection signal. At the same time, the multiplexer 3 sends the received analog voice signal to the selected signal channel. For example, if the first signal channel A1 needs to be tested, the generating module 103 generates a first selection signal for selecting the first signal channel A1 and outputs the first selection signal to the controller 2. The controller 2 outputs control signals, such as "0000" to the address input terminal S0-S3 of the multiplexer 3 according to the first selection signal. Wherein, "0" represents a low level signal, and "1" represents a high level signal. The multiplexer 3 receives the control signals and selects an output terminal, such as Y0, to switch to a signal channel to be tested, such as signal channel A1 to be tested from the signal channels according to the first selection signal. After the signal channel is selected, the multiplexer 3 sends the received analog voice signal to the selected signal channel A1. If the second signal channel A2 needs to be tested, the generating module 103 generates a second selection signal for selecting the second signal channel A2 and outputs the second selection signal to the controller 2. The controller 2 outputs control signals, such as "0100" to the address input terminal S0-S3 of the multiplexer 3 according to the second selection signal. The multiplexer 3 receives the control signals and selects an output terminal, such as Y1, to switch to the signal channel to be tested, such as signal channel A2 from the signal channels to be tested according to the second selection signal. After the signal channel is selected, the multiplexer 3 sends the received analog voice signal to the selected signal channel A2.

In block S5, the voice detection module 101 detects whether the DVR 1 receives the analog voice signal from the selected signal channel. If the DVR 1 does not receive the video signal from the selected signal channel, block S6 is implemented. If the DVR 1 receives the voice signal from the selected signal channel, block S7 is implemented.

In block S6, the display module 104 displays the ID number of the selected signal channels on the display device 4, to indicate that the signal channel cannot perform the voice transmission function properly, and block S7 is implemented.

In block S7, the voice detection module 101 determines whether all of the signal channels have been tested by the format voice data according to the ID numbers. In one embodiment, the voice detection module 101 detects the ID number of a signal channel to determine whether the signal channel has been tested. If any signal channel has not been tested, block S3 is repeated. If all of the signal channels have been tested, block S8 is implemented.

In block S8, the voice detection module 101 determines whether all of the signal channels have been tested by all of the format voice data stored in the storage unit 11 according to the ID numbers. If any signal channel has not been tested, block S2 is repeated. If all of the signal channels have been tested, the flow ends.

The apparatus and method can automatically test all of the signal channels with different voice data formats. Therefore, it is simple and cost effective.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:
1. A digital video recorder (DVR), being connected with a controller and a multiplexer, the DVR comprising:
   a processor;
   a command output interface;
   a signal output interface;
   a storage unit to store different voice data formats; and a channel test unit stored in the storage unit and being executable by the processor, the channel test unit comprising:

a command generation module to generate a selection signal and send the selection signal to the controller through the command output interface, the controller to output control signals to address input terminals of the multiplexer according to the selection signal, to select an output terminal of the multiplexer to switch to a signal channel to be tested from the signal channels;

a signal generation module to obtain a format voice data from the storage unit and convert the voice data to an analog voice signal, and send the analog voice signal to the input terminal of the multiplexer through the signal output interface, the multiplexer to send the analog voice signal to the selected signal channel after the signal channel is selected;

a voice detection module to define an identification (ID) number for each of the signal channels of the DVR in sequence, and detect whether the DVR receives an analog voice signal from the selected signal channel, and determine whether all of the signal channels have been tested according to the ID numbers; and a display module to display an ID number of the selected signal channel on a display device when the DVR does not receive the analog voice signal from the selected signal channel.

2. The DVR according to claim 1, wherein the signal output interface is an Electronic Industry Association recommended standard-232 (EIA-RS-232) interface.

3. The DVR according to claim 1, wherein the command output interface is a universal serial bus (USB) interface.

4. The DVR according to claim 1, wherein the storage unit stores the voice data having a wave audio files (WAV) format or a windows media audio (WMA) format.

5. A method for testing signal channels of a digital video recorder (DVR), the method comprising:

defining an identification (ID) number for each of the signal channels of the DVR in sequence;

obtaining a formatformat voice data from a storage unit, and converting the voice data to an analog voice signal, and outputting the analog voice signal to input terminals of a multiplexer through a signal output interface of the DVR;

generating a selection signal and sending the selection signal to a controller through a command output interface of the DVR;

outputting control signals to address input terminals of the multiplexer according to the selection signal and selecting an output terminal of the multiplexer to switch to a signal channel to be tested from the signal channels according to the control signals, and sending the received analog voice signal to the selected signal channel after the signal channel is selected;

detecting whether the DVR receives the analog voice signal from the selected signal channel;

displaying the ID number of the selected signal channel on the display device in responding to not receiving the analog voice signal from the selected signal channel;

determining whether all of the signal channels have been tested by the format voice data according to the ID numbers in responding to the DVR receives the analog voice signal from the selected signal channel, and returning to "generating a selection signal and sending the selection signal to a controller through a command output interface of the DVR" in responding to any signal channel has not been tested by the format voice data; and determining whether all of the signal channels have been tested by all of the format voice data stored in the storage unit in responding to all of the signal channels have been tested by the format voice data, and returning to "obtaining a format voice data from a storage unit, and converting the voice data to an analog voice signal, and outputting the analog voice signal to input terminals of a multiplexer through a signal output interface of the DVR" in responding to any signal channel has not been tested by all of the format voice data, the flow ending in responding to all of the signal channels have been tested by all of the format voice data.

6. The method according to claim 5, wherein the signal output interface is an Electronic Industry Association recommended standard-232 (EIA-RS-232) interface.

7. The method according to claim 5, wherein the command output interface is a universal serial bus (USB) interface.

8. The method according to claim 5, wherein the storage unit stores the voice data having a wave audio files (WAV) format or a windows media audio (WMA) format.

* * * * *